US012563312B2

(12) United States Patent
Gaffet et al.

(10) Patent No.: US 12,563,312 B2
(45) Date of Patent: Feb. 24, 2026

(54) TIME-OF-FLIGHT WAKE ON ATTENTION

(71) Applicant: STMicroelectronics International N.V., Geneva (CH)

(72) Inventors: Ulysse Gaffet, Grenoble (FR); Olivier Lemarchand, Grenoble (FR)

(73) Assignee: STMicroelectronics International N.V., Geneva (CH)

( * ) Notice: Subject to any disclaimer, the term of this patent is extended or adjusted under 35 U.S.C. 154(b) by 68 days.

(21) Appl. No.: 18/751,491

(22) Filed: Jun. 24, 2024

(65) Prior Publication Data

US 2025/0392835 A1     Dec. 25, 2025

(51) Int. Cl.
H04N 25/42 (2023.01)
G06T 7/70 (2017.01)

(52) U.S. Cl.
CPC .............. H04N 25/42 (2023.01); G06T 7/70 (2017.01); *G06T 2207/20084* (2013.01)

(58) Field of Classification Search
CPC .. H04N 25/42; G06T 7/70; G06T 2207/20084
USPC .................................................. 348/207.99
See application file for complete search history.

(56) References Cited

U.S. PATENT DOCUMENTS

| | | | | |
|---|---|---|---|---|
| 2015/0092019 A1* | 4/2015 | Asano | .................. | H04N 25/587 |
| | | | | 348/136 |
| 2020/0193630 A1 | 6/2020 | Mousavian | | |
| 2020/0342291 A1 | 10/2020 | Croxford | | |
| 2021/0149441 A1 | 5/2021 | Bartscherer et al. | | |
| 2021/0240493 A1 | 8/2021 | Hamlin | | |
| 2021/0326694 A1 | 10/2021 | Wang | | |
| 2022/0236797 A1 | 7/2022 | Drozdov | | |
| 2022/0308228 A1* | 9/2022 | Raag | .................... | G01S 17/931 |
| 2022/0413145 A1 | 12/2022 | Yang | | |

OTHER PUBLICATIONS

Extended European Search Report, Application No. 25183235.8, mailed Oct. 29, 2025, 12 pages.

* cited by examiner

*Primary Examiner* — Usman A Khan

(74) *Attorney, Agent, or Firm* — Slater Matsil, LLP

(57)     ABSTRACT

According to an embodiment, a method includes collecting, by a time-of-flight (ToF) sensor, real time raw data of a scene comprising a user in its field of view; generating, by a first neural network, an estimate of a posture of the user based on a distance calculated to the user; generating, by a second neural network and in response to determining that the estimate of the posture of the user meets a first criterion, an estimate of a head orientation of the user based on the distance, a standard deviation of the distance, the number of photons returning per unit of time, a standard deviation of the signal value, and a reflection value; and transitioning from low-power to normal mode in response to determining that the user is actively engaged with the device based on the estimate of the head orientation of the user.

20 Claims, 5 Drawing Sheets

100

300

400

402 — COLLECT REAL-TIME RAW DATA

404 — CALCULATE DISTANCE TO OBJECT

406 — NEURAL NETWORK GENERATES OUTPUT DATA

408 — ESTIMATE USER POSTURE

410 — END

_500_

502 — COLLECT REAL-TIME RAW DATA

504 — CALCULATE STATE, DISTANCE, DISTANCE STD DEV, SIGNAL, SIGNAL STD DEV, REFLECTANCE

506 — FEED CALCULATED VALUES TO NEURAL NETWORK

508 — NEURAL NETWORK GENERATES OUTPUT DATA

510 — ESTIMATE USER'S HEAD ORIENTATION

512 — END

TIME-OF-FLIGHT WAKE ON ATTENTION

TECHNICAL FIELD

The present disclosure generally relates to electronic systems and, in particular, embodiments, to wake on attention using a time-of-flight system.

BACKGROUND

In modern devices, Human Presence Detection (HPD) technology enhances user experience and energy efficiency. By integrating HPD solutions, electronic systems can intelligently detect a user's presence and consequently wake from a low-power state. This feature provides a seamless and intuitive interface, allowing immediate system engagement upon the user's return. Implementing such technology requires minimizing the false wake-up rate, and it would be beneficial to ensure that the HPD system can distinguish between intended user interactions and non-engagement scenarios. For example, avoiding unintended laptop activations would be beneficial, as they can lead to unnecessary power consumption and potential system wear.

SUMMARY

Technical advantages are generally achieved by embodiments of this disclosure, which describe a wake on attention using a time-of-flight system.

A first aspect relates to a device. The device includes a time-of-flight (ToF) sensor and a processor. The Tof Sensor is configured to collect real time raw data of a scene comprising a user in a field of view of the ToF sensor. The processor comprising a first neural network and a second neural network, wherein the first neural network is configured to generate an estimate of a posture of the user based on a distance calculated for each zone of the ToF sensor to the user, wherein the second neural network is configured to, in response to determining by the processor that the estimate of the posture of the user meets a first criterion, generate an estimate of a head orientation of the user based on the distance, a standard deviation of the distance, a signal value corresponding to a number of photons returning towards the ToF sensor per unit of time, the a standard deviation of the signal value, and a reflection value calculated for each zone of the ToF sensor, and wherein the processor is configured to transition the device from a low-power operating mode to a normal operating mode in response to determining that the user is actively engaged with the device based on the estimate of the head orientation of the user.

A second aspect relates to a method. The method includes collecting, by a time-of-flight (ToF) sensor of a device, real time raw data of a scene comprising a user in a field of view of the ToF sensor; generating, by a first neural network, an estimate of a posture of the user based on a distance calculated for each zone of the ToF sensor to the user; generating, by a second neural network and in response to determining by a processor that the estimate of the posture of the user meets a first criterion, an estimate of a head orientation of the user based on the distance, a standard deviation of the distance, a signal value corresponding to a number of photons returning towards the ToF sensor per unit of time, a standard deviation of the signal value, and a reflection value calculated for each zone of the ToF sensor to the user; and transitioning, by the processor, the device from a low-power operating mode to a normal operating mode in response to determining that the user is actively engaged with the device based on the estimate of the head orientation of the user.

A third aspect relates to a method. The method includes collecting, by a time-of-flight (ToF) sensor of a device, raw data of scenes in a field of view of the ToF sensor, wherein the scenes correspond to different rotations, orientations, positionings of a user in the field of view of the ToF sensor; training a neural network using the collected raw data; collecting, by the ToF, real time raw data of a scene comprising a user in the field of view of the ToF sensor; generating, by the neural network, an estimate of a posture of the user based on a distance calculated for each zone of the ToF sensor; generating, by the neural network and in response to determining by a processor that the estimate of the posture of the user meets a first criterion, an estimate of a head orientation of the user based on the distance, a standard deviation of the distance, a signal value corresponding to a number of photons returning towards the ToF sensor per unit of time, and a standard deviation of the signal value for each zone of the ToF sensor to the user; and activating, by the processor, an authentication procedure in response to determining that the user is actively engaged with the device based on the estimate of the head orientation of the user.

Embodiments can be implemented in hardware, software, or any combination thereof.

BRIEF DESCRIPTION OF THE DRAWINGS

For a more complete understanding of the present disclosure and the advantages thereof, reference is now made to the following descriptions taken in conjunction with the accompanying drawings, in which.

DETAILED DESCRIPTION OF ILLUSTRATIVE EMBODIMENTS

Figure 1:
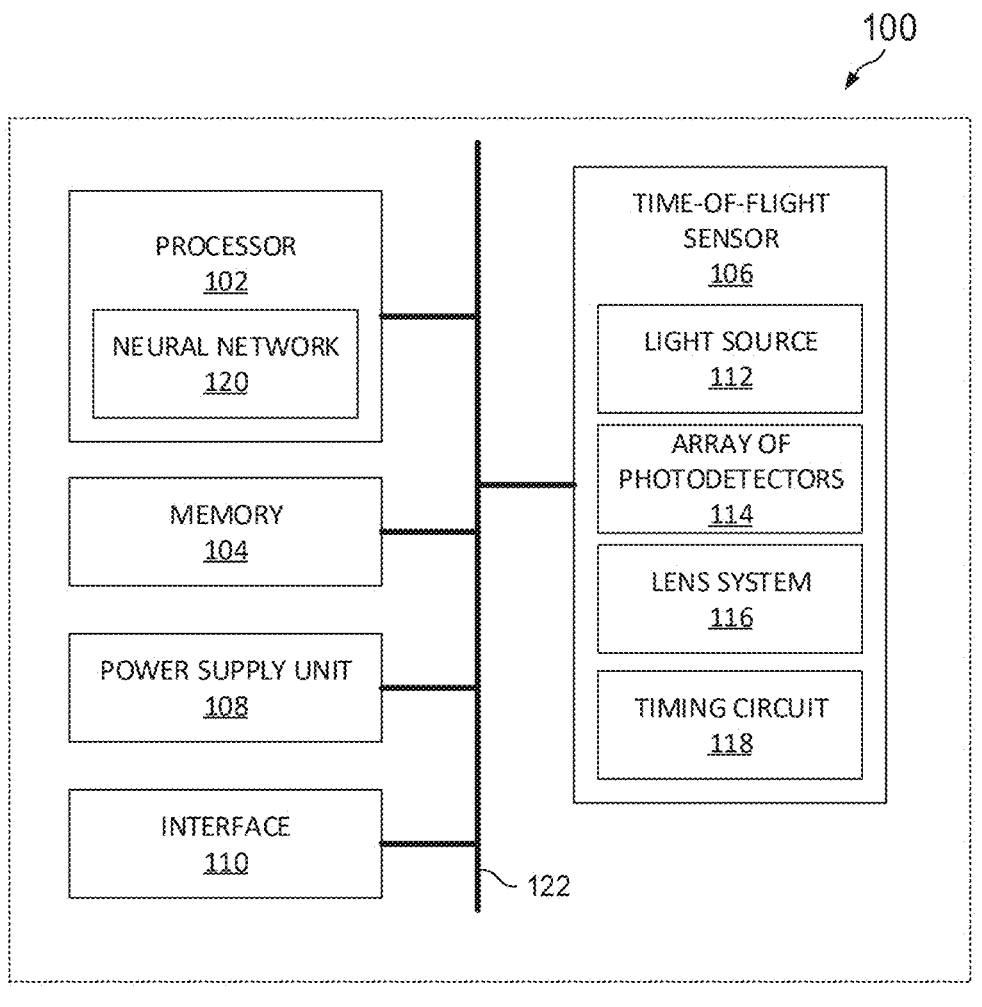
FIG. 1 is a block diagram of an embodiment system.

This disclosure provides many applicable inventive concepts that can be embodied in a wide variety of specific contexts. The particular embodiments are merely illustrative of specific configurations and do not limit the scope of the claimed embodiments. Features from different embodiments may be combined to form further embodiments unless noted otherwise. Various embodiments are illustrated in the accompanying drawing figures, where identical components and elements are identified by the same reference number, and repetitive descriptions are omitted for brevity.

Variations or modifications described in one of the embodiments may also apply to others. Further, various changes, substitutions, and alterations can be made herein without departing from the spirit and scope of this disclosure as defined by the appended claims.

While the inventive aspects are described primarily in the context of a computer system, it should also be appreciated that they may also apply to other applications, such as various industrial, commercial, and automotive applications. In particular, aspects of this disclosure may similarly apply to any application that can benefit from embodiments disclosed herein. Further, although aspects of the disclosure describe the turning ON of a device or the transitioning from a standby mode to fully powered mode, these aspects can be extended to, for example, adaptive dimming, gesture detection, or the like. As another example, embodiments of the disclosure may be adapted to applications such as levels 2-5 of autonomous driving where a signal is generated by the ECU of the vehicle when the user is not paying attention to the road.

Aspects of this disclosure refine the laptop's wake-up mechanism to ensure that it activates only when the user is genuinely intending to interact with the device. The improvement focuses on discerning user engagement by detecting, for example, if an individual is seated directly in front of the laptop, assuming a posture indicative of an intent to use it. Specifically, an objective is for the laptop to power up from sleep mode when it identifies that a user is not only present but also looking at the screen, as opposed to being engaged in conversation with colleagues or looking in another direction.

This enhanced approach endeavors to eliminate scenarios commonly called "false wake-ups." These occur when the laptop exits sleep mode and unnecessarily expends battery power without any meaningful interaction from the user. For instance, if a person's laptop is sitting on a desk and they merely approach to retrieve their phone or another item without the desire to use the laptop, current market solutions might activate an authentication sequence. However, since the person is standing and not facing the screen, the system will ultimately not unlock, having wasted power.

Accordingly, embodiments of the disclosure focus on this attention-aware system triggering the laptop's wake-up and login processes in response to confirming the user's attention being directed at the screen. This ensures efficient power usage and enhances the overall user experience by aligning the system responsiveness with actual usage intent.

The proposed "wake on attention" enhances the existing "wake on approach" feature that activates a system merely based on user proximity. Alternatively, a camera, such as a webcam, could implement this functionality. However, using a ToF sensor has distinct advantages, such as preserving user privacy and reducing power consumption without relying on dedicated artificial intelligence accelerators for camera-based solutions. Moreover, the proposed system remains effective even when the user wears a facemask and does not rely solely on facial recognition technology. It can accurately detect and categorize head orientations across various angles, including left, right, up, down, and intermediate positions.

In embodiments, the proposed wake-on-attention feature mitigates false wake-ups by analyzing the user's body posture and head orientation before initiating a wake-up, ensuring that the laptop wakes up only when the user genuinely engages. These and additional details are further detailed below.

FIG. 1 illustrates a block diagram of an embodiment system 100. System 100 includes a processor 102, a memory 104, a time-of-flight (ToF) sensor 106, a power supply unit (PSU) 108, and an interface 110, which may (or may not) be arranged as shown. Although one of each (i.e., the processor 102, the neural network 120, the memory 104, the ToF sensor 106, the power supply unit 108, and the interface 110)

is shown in FIG. 1, the number of components is not limiting, and greater numbers are similarly contemplated in other embodiments.

System 100 may include additional components not depicted, such as long-term storage (e.g., non-volatile memory, etc.), power management circuitry, security and encryption modules (e.g., trusted platform modules (TPM), etc.), a global positioning satellite (GPS) sensor, transmitters, receivers, cameras, or the like.

System 100 may be a laptop, a desktop computer, a tablet, a smartphone, a smartwatch, a wearable headset (e.g., virtual reality or augmented reality), smart glasses, an e-reader, a digital picture frame, a smart home assistant, a smart TV, a digital camera or camcorder, a portable gaming device, a security device, a monitoring device, an automotive infotainment system, an interactive whiteboard, a medical device, an industrial control panel, an interactive kiosk, an automated teller machine (ATM), or any system or subsystem capable of hosting the ToF sensor 106.

In embodiments, each component can communicate with any other component internally within or external to the system 100 through the bus 122. For example, each component can communicate using the $I^2C$ (Inter-Integrated Circuit), alternatively known as I2C or IIC, communication protocol, the $I^3C$ (Improved Inter Integrated Circuit) communication protocol, the serial peripheral interface (SPI) specification, or the like.

Processor 102 may be any component or collection of components adapted to perform computations or other processing-related tasks. In embodiments, processor 102 is an application processor, a baseband processor, or a microcontroller. In embodiments, system 100 may include a primary processor and multiple auxiliary processors. Each auxiliary processor may be dedicated to performing specific operations within the system 100 coordinated by the primary processor. In embodiments, the different cores or processors of processor 102 can operate in different power modes such as standby, low-power, etc.

Processor 102 includes a neural network 120. In embodiments, processor 102 can operate a pre-trained artificial intelligence (AI) neural network or machine learning model (MLM) and is configured to handle complex computations efficiently and expediently. In embodiments, processor 102 is a multi-core processor with specialized accelerators within the neural network 120 that are specifically optimized for high-speed mathematical and parallel processing tasks characteristic of AI operations. These features allow it to execute the vast number of calculations required for neural network algorithms with minimal latency. In embodiments, processor 102 includes dedicated units within the neural network 120 to execute matrix multiplications and other linear algebra operations.

In embodiments, processor 102 can carry out tasks using a machine learning model already trained with large datasets. Training encompasses adjusting the model's parameters (weights and biases) to make predictions or decisions without being explicitly programmed to perform the task. Once trained, the model is deployed onto the processor 102, applying those learned parameters to new data inputs. Processor 102 evaluates this data through the model's network layers, which include interconnected nodes mimicking biological neurons, to arrive at a specific output.

In embodiments, the neural network 120 is configured to determine a user's posture or head orientation with respect to the system 100 based on the data collected by the ToF sensor 106. In response to determining that that user's posture and head orientation are within established criteria indicating that the user is actively engaged with the device, the processor 102 transitions the system 100 from low-power mode to full power and, for example, initiate an authentication process.

Memory 104 may be any component or collection of components adapted to store programming or instructions for execution by processor 102. In an embodiment, memory 104 includes a non-transitory computer-readable medium. In embodiments, memory 104 includes efficient management so that processor 102 can rapidly access and modify large data sets collected through the ToF sensor 106. Memory 104 may include integrated high-bandwidth memory interfaces.

ToF sensor 106 measures the distance between it and objects in its field of view by utilizing the speed of light. ToF sensor 106 emits a light signal, which travels to the target object, reflects off it, and then is captured back by the ToF sensor 106. The time taken for this round trip is measured—and because the speed of light is constant, the distance to the object can be calculated accurately by the ToF sensor 106 using this time measurement.

ToF sensor 106 includes a light source 112, typically an infrared (IR) LED, a laser diode, or a vertical-cavity surface-emitting laser (VCSEL). The light source 112 emits a light signal towards an object to be measured. In embodiments, ToF sensor 106 uses a continuous wave of light (i.e., indirect time-of-flight (iToF)). In embodiments, ToF sensor 106 uses pulsed light signals (i.e., direct time-of-flight (dToF) applications).

On the receiving end of the signal is an array of photo-detectors 114 sensitive to the specific wavelength of the emitted light. ToF sensor 106 may include a lens system 116 to focus the emitted light into a beam and ensure that reflected light is directed onto the array of photodetectors 114. In embodiments, the array of photodetectors 114 is a Single-Photon Avalanche Diode (SPAD) detection array with multiple pixels (i.e., photodetectors). ToF sensor 106 may include additional components not shown, such as memory, a microcontroller, and a VCSEL driver.

Each detector in the array of photodetectors 114 can act independently to capture the reflected light signals. System 100 measures the time each pixel takes to capture the reflected light. Consequently, a full array of distance measurements from all pixels can be consolidated to generate a comprehensive scene depth map. This depth map includes details about the distances of all points in the environment from the camera. The collected data can be analyzed to identify where there are significant changes in depth, signifying contours or edges of objects. By delineating these variations in depth, the outlines of objects can be effectively detected. The dataset can be further processed to generate a highly detailed spatial understanding of any scene and a coherent three-dimensional representation with a clear demarcation of objects and features.

ToF sensor 106 may include a timing circuit 118 for accurately measuring the interval between when the light is emitted and when it is detected after reflection. In embodiments, timing circuit 118, in concert with the processor 102, provides the signals to operate the ToF sensor 106 (e.g., transmission of the light signal and reception of the reflected light signal).

In embodiments, processor 102 receives data from the ToF sensor 106, interprets the timing data, and converts it into distance measurements. The processor 102 may apply algorithms to refine the data, compensating for factors like ambient light noise or object reflectivity variations to provide more reliable distance information. ToF sensor 106 may be a multi-zone ToF sensor that can measure distances in several separate zones, such as 4×4, 8×8, or 16×16 zones.

In embodiments, ToF sensor 106 may include a dedicated low-power processor and memory to operate the ToF sensor 106 without the need to run the processor 102 and memory 104 for sensor-related executions, which typically consume more power than a local and dedicated circuit component for the ToF sensor 106.

Power supply unit 108 may be any component or collection of components that provide power to one or more components within the system 100. Power supply unit 108 may include various power management circuitry, charge storage components (i.e., battery), or the like. Power supply unit 108 may include dynamic scaling technologies that adjust power usage according to the workload to manage the energy demands of computations.

Interface 110 may be any component or collection of components that allow processor 102 to communicate with other devices/components or a user. For example, interface 110 may be adapted to allow a user or ToF sensor 106 to interact/communicate with the system 100. In embodiments, interface 110 includes one or more display screens.

Generally, system 100 can transition to a low-power or standby mode to conserve energy when the device is not actively used. Conventional system wake-on solutions, such as the wake-on-approach feature, use the ToF sensor 106 to detect the presence of humans in the vicinity to manage power efficiently. The ToF sensor 106 can then be used in the low-power mode to trigger reactivation. ToF sensor 106 can constantly monitor the environment, albeit at reduced power or intermittently, to identify changes in depth within its field of view that would indicate the presence of a person.

When someone approaches system 100, the ToF sensor 106 detects the change in distance of objects in its range, thanks to its multiple pixels that measure the time light takes to reflect back from the person to the sensor. System 100 analyzes this movement and in-depth information to determine whether it corresponds to human presence and the user's approach toward system 100.

Upon confirming a human approaching the system 100, a flag or an interrupt signal is generated, indicating that it's time for the system 100 to transition out of standby mode. This signal is communicated to the device's main processor or power management controller, prompting it to initiate a wake-up sequence. Consequently, system 100 seamlessly transitions from its energy-saving mode to fully powered mode, readying it for immediate interaction with the user.

Utilizing such technology offers convenience to the user and energy efficiency for the device. No physical interaction is needed to wake the system 100; simply being in the right place prompts activation. This system 100 could be employed in a wide range of devices, especially those frequently used and left idle, like smart home devices, personal computers, security systems, or interactive displays, where such an intelligent power management system would significantly enhance user experience and device functionality.

However, existing solutions are limited to detecting a human approaching to activate or wake devices. This presents several disadvantages, particularly in scenarios where the system activation is unintended, which can compromise power efficiency and user experience. Specifically, while existing solutions may be adept at detecting environmental changes, they lack the sophistication to discern the intent behind a person's approach. This is especially problematic in high-traffic areas where a user passing by the sensor's field of view could inadvertently trigger the system 100 to exit standby mode, leading to unnecessary power consumption and wear on the system's components.

Adding delays or timers to mitigate false activations can also present issues. Suppose the delay before activation is too long. In that case, the user may find system 100 unresponsive, as it does not power up immediately when needed, leading to frustration or the user resorting to manual interaction. On the other hand, in busy environments, constant motion can repeatedly reset the delay timer, effectively keeping the system 100 active for prolonged periods and defeating the purpose of energy-saving modes.

Such misinterpretations cause devices to cycle between active and standby modes more frequently than required, resulting in a net increase in energy consumption-counteractive to the goal of conserving power. Furthermore, this can lead to a decrease in the overall lifespan of system 100 due to the increased number of power state transitions and potential heat stress.

Figure 2:
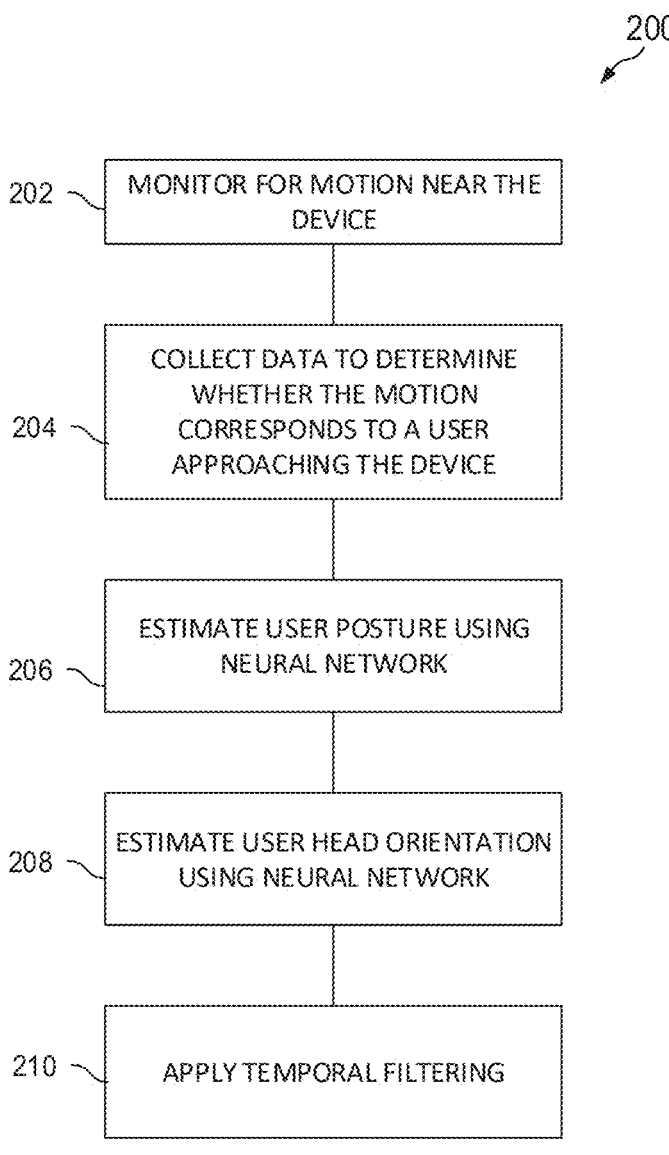
FIG. 2 is a flow chart of an embodiment method for a wake-on-attention feature.

FIG. 2 illustrates a flow chart of an embodiment method 200 for a wake-on-attention feature, which can be implemented in system 100 to wake system 100. Method 200 advantageously transitions system 100 from standby mode to full power in response to user engagement as detected by, for example, the ToF sensor 106. It is noted that all steps outlined in method 200 are not necessarily required and can be optional. Further, changes to the arrangement of the steps, removal of one or more steps and path connections, and addition of steps and path connections are similarly contemplated.

At step 202, one or more device sensors are configured to monitor for motion near the device. In embodiments, the device is in lower power mode during step 202. In embodiments, one or more device sensors operate in a low-power mode by, for example, increasing the intervals for data collection. In response to a controller determining that the data collected by one or more device sensors during the monitoring correspond to motion, method 200 transitions to step 204; otherwise, the method remains at step 202.

In embodiments, the controller executes instructions that compare the data collected at step 202 with one or more threshold values, and in response to the data exceeding one or more threshold values, the controller generates a signal indicating the detection of motion.

In embodiments, the controller triggers the one or more device sensors to collect data at set intervals to minimize power consumption by the device. In embodiments, the controller pauses the monitoring by the one or more sensors in response to detecting motion.

In embodiments, the controller is a dedicated, low-power microcontroller on the sensor. In embodiments, the controller is the processor 102. In embodiments, the instructions to perform step 202 are stored in memory, such as memory 104.

At step 204, once the presence of motion is detected near the device, device sensors are configured to collect data to determine whether the motion corresponds to a user approaching the device. In embodiments, the device is in lower power mode during step 204. In embodiments, one or more device sensors operate in a low-power mode by, for example, increasing the intervals for the data collection. In embodiments, the interval between collecting data is shorter than at step 202.

In response to a controller determining that the data collected by one or more device sensors during the monitoring corresponds to a user approaching the device, method 200 transitions to step 206; otherwise, the method remains at step 204 or returns to step 202.

In embodiments, the controller executes instructions that compare the data collected at step 204 with one or more threshold values, and in response to the data exceeding one or more threshold values, the controller generates a signal indicating the user approaching the device.

In embodiments, data collected at each interval determines the distance between the device and the object. The controller can determine whether the object is approaching the device if the distance measurement is less than a threshold (e.g., less than 1.5 m) or is reducing in value at a certain pace.

In embodiments, the controller triggers the one or more device sensors to collect data at set intervals to minimize power consumption by the device. In embodiments, the controller is a dedicated, low-power microcontroller on the sensor. In embodiments, the controller is the processor 102. In embodiments, the instructions to perform step 204 are stored in memory, such as memory 104. In embodiments, step 202 is optional, and the device is configured to use step 204 as an initial step and to determine the next steps in method 200. In embodiments, steps 202 and 204 are combined in a single step to determine motion and an object approaching the device.

At step 206, once the controller has determined that the user is approaching the device and within a threshold distance, a first trained machine learning model is used to estimate the user's posture. If the model detects that a user's posture aligns with established criteria during real-time monitoring, method 200 advances to step 208. Otherwise, the device remains at step 206 and continues to collect data to determine a point at which the user's posture meets the established criteria. In embodiments, the method returns to steps 202 or 204 if the method at 206 fails to indicate an acceptable user posture within a set duration.

In embodiments, the established criteria are based on detecting a user's head or body within the field of view of the device's one or more sensors. In embodiments, the machine learning model is trained based on labeled data within the vicinity of the device corresponding to a user's head or body within the field of view of the one or more sensors.

For example, the first trained machine learning model may provide a negative output (e.g., negative signal flag) indicating that the user's posture does not align with the established criteria when the data collected by the one or more sensors correspond to a user approaching the device while walking backward, a user standing in front of a desk while looking at a smartphone, or a user sitting in front of the desk but turned around and facing colleagues. As another example, the first trained machine learning model may provide a positive output (e.g., positive signal flag) indicating the user's posture aligns with the established criteria when the data collected by the one or more sensors correspond to the user sitting in front of the table on which the device is situated and for example, centered within a window.

As another example, if the object approaching the device is not a human (e.g., a cat) or if the object is a moving chair and the human moving the chair is outside of the field of view of the one or more sensors, then the data collected by the one or more sensors, which are fed to the first trained machine learning model, would result in a negative output.

Accordingly, step 206 allows the first trained machine learning model to determine whether the object is a human and whether the human is situated in a configuration with respect to the device (i.e., correct posture) to determine the orientation of the user's head at step 208.

In embodiments, the output of the first trained machine learning model is "0," indicating a bad posture, and "1," indicating a good posture. If the output of the first trained machine learning model is a "1," indicating a good posture, the method transitions to step 208. Otherwise, the device remains at step 206 and continues to collect data to determine a point at which the output of the first trained machine learning model equals "1." In embodiments, the method returns to steps 202 or 204 if the method at 206 fails to indicate an acceptable user posture within a set duration.

In embodiments, the output of the first trained machine learning model is within a range (e.g., between 1 and 100) where one extreme indicates the worst posture and the other extreme indicates a perfect posture. An adjustable threshold may be set, where if the output of the first trained machine learning model exceeds the threshold, the method transitions to step 208. Otherwise, the device remains at step 206 and continues to collect data to determine a point at which the output of the first trained machine learning model exceeds the adjustable threshold. In embodiments, the method returns to steps 202 or 204 if the method at 206 does not exceed the adjustable threshold within a set duration.

At step 208, once it has been established at step 206 that the user's posture is within the established criteria, a second trained machine learning model assesses the orientation of the user's head based on established criteria during real-time monitoring. The device remains at step 208 and continues to collect data to determine a point at which the user's head orientation meets the established criteria. In embodiments, the method returns to steps 202 or 204 after step 208 is activated without indicating an acceptable user's head orientation.

For example, the second trained machine learning model determines whether the user's head orientation is directed toward the device's screen or one or more sensors. Such orientation strongly indicates the user's intent to interact with the device.

In embodiments, the second trained machine learning model can determine whether the user's face is directed towards the north, northeast, northwest, east, west, or south directions with respect to the sensor or device.

The north direction corresponds to a user's face directly facing the device. The east direction corresponds to the user's face rotated fully in the right direction with respect to the device. The west direction corresponds to the user's face rotated fully in the left direction with respect to the device. The northeast direction corresponds to the user's face rotated halfway between the north and the east directions. The northwest direction corresponds to the user's face rotated halfway between the north and the west directions. The south direction corresponds to the back of the user's head facing the device or sensor.

In embodiments, the second trained machine learning model is pre-trained to determine the direction of the user's face when the user's head is positioned off-center (i.e., not centered with respect to the device) but within the field of view of the sensor. For example, the second trained machine learning model can be trained to determine that the user's face is directed towards the north when the user's face is off-center but slightly turned to face the camera. By training the second trained machine learning model to associate the positioning of the user's face (i.e., head orientation) and not the head with respect to the sensor or device, embodiments of the disclosure can advantageously detect the user's engagement with the device, as the exact head location is not determinative of the outcome.

In embodiments, the time-of-flight sensor used to collect the raw data is located beside the device's camera used to authenticate the user.

At step 210, an optional temporal filtering technique is applied if the second trained machine learning model provides a valid user head orientation. The temporal filtering technique is used to verify that the user is facing the screen with an orientation suggesting engagement for a set duration (i.e., for N number of consecutive frames, where N is an integer greater than one).

If the temporal filtering technique verifies that the user is facing the screen with the orientation suggesting engagement for the set duration, the system can initiate appropriate interactive processes, such as waking up the device or triggering login and authentication procedures.

As another example, the system can determine that the user is not actively engaged and perform an action. For example, in a virtual team meeting, the main feed may switch to another system or switch to the system based on the user's engagement, as estimated by the second trained machine learning model.

The application of machine learning model techniques enhances user experience by enabling intuitive device responsiveness and contributes to power efficiency by minimizing erroneous activations. Thus, leveraging machine learning models to interpret sensor data advantageously fosters smarter and more seamless human-device interactions.

In embodiments, steps 206 and 208 are combined. A single trained machine learning model determines whether the user's posture meets the established criteria. The user's head orientation is directed toward the device's screen or the one or more sensors of the device.

In embodiments, step 206 (i.e., posture check) is executed before step 208 (i.e., head orientation check), making the process sequential. The head orientation output can be relied upon if the posture output indicates a GOOD posture. In embodiments, the neural network for determining user posture is executed first for each frame, and its output is stored. The neural network for determining the user head orientation is subsequently executed.

A logical AND operation can be performed between the output of the neural network for determining user posture and the output of the neural network for determining the user head orientation to, for example, wake up the device in response to (i) the posture being determined to be GOOD and (ii) the user's head orientation indicating to face North for several frames.

In embodiments, data used to detect motion, determine a user approaching the system, determine the user's posture, and determine the user's head orientation is collected by one or more components, individually or collectively. In embodiments, one or more datasets are collected using a low-resolution time-of-flight sensor that includes, for example, an 8×8 resolution photodetector array. Advantageously, a time-of-flight sensor protects user privacy and reduces power consumption.

Figure 3:
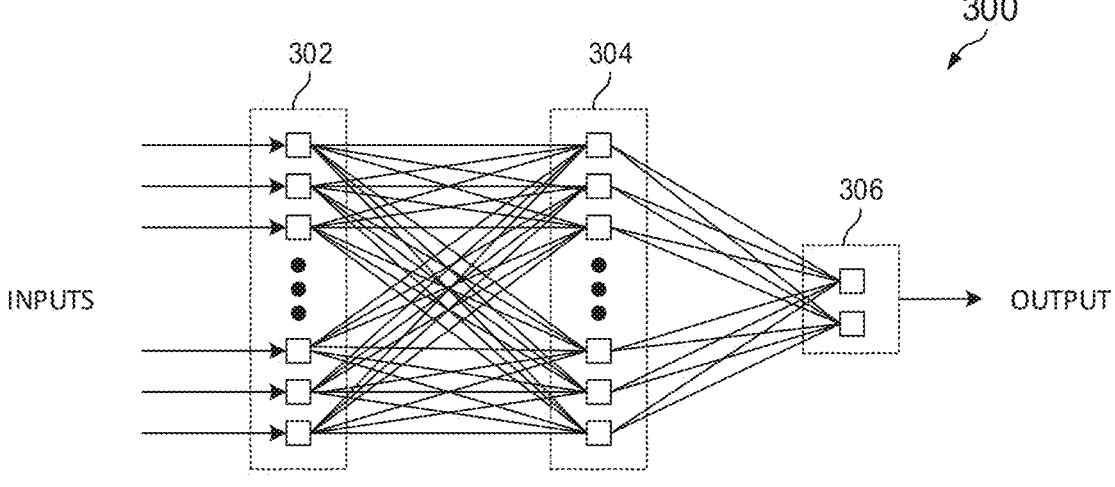
FIG. 3 is a simplified block diagram of an embodiment neural network.

FIG. 3 illustrates a simplified block diagram of an embodiment neural network 300, which may be implemented in processor 102 of system 100. As shown, neural network 300 includes an input layer 302, an optional hidden layer 304, and an output layer 306, which may (or may not) be arranged as shown and may (or may not) be the size as shown. Neural network 300 may include additional hidden layers not shown.

The input layer 302 includes multiple nodes (or neurons) that receive the input data. In this case, the input data to the neural network 300 is the readout (i.e., raw real-time readout or processed real-time readout) generated from the ToF sensor 106. Each node represents either a rate (i.e., the intensity of the reflected signal) or a range (i.e., distance to an object) for each zone in a multi-zone ToF sensor. The range for each zone can calculated based on the time it takes for emitted light to travel to the object and back to the ToF sensor 106. The rate for each zone represents the strength of the reflected signal that the ToF sensor 106 receives.

Between the input layer 302 and the output layer 306 is the optional hidden layer 304 (although only a single hidden layer is shown in FIG. 3, additional or no hidden layers are contemplated in other embodiments). The hidden layer 304 consists of nodes that transform the inputs from the previous layer (here, the input layer 302) using weights, biases, and a non-linear activation function. Through training, the neural network 300 learns the appropriate weights and biases for these transformations to model the validity and invalidity classification for the user's posture or the orientation of the user's head against the ToF sensor 106.

In embodiments, the output layer 306 includes a single output node. The single node corresponds to a classification of a valid criterion based on a threshold value. For example, if the output of the neural network 300 is less than 0.5 (e.g., output equals zero), the result of the neural network 300 is 'invalid'. In contrast, if the output of the neural network 300 is greater than 0.5 (e.g., output equals one), the result of the neural network 300 is 'valid.'

In embodiments, the output layer 306 includes two output nodes. The two nodes correspond to a classification of a 'yes' or 'valid' output and a 'no' or an 'invalid' output.

In embodiments, the output layer 306 includes three output nodes. The three nodes correspond to a classification of a 'yes' or 'valid' output, a 'no' or an 'invalid' output, and 'nothing.'

In embodiments, the output layer 306 provides a single value within a range of possible values. One end of the range corresponds to the worst posture or poor head orientation, and the other corresponds to the best posture and head orientation. The processor 102 can use a threshold to fine-tune the validity or invalidity of the output.

The output layer 306 produces the neural network's predictions or classifications. As shown, the output layer 306 includes a single binary output that is either valid or invalid. By reducing the classification to valid or invalid, the size of the neural network is reduced, and the efficiency of processing the input data to determine the orientation is improved.

Neural network 300 may be used for the first trained machine learning model outlined in step 206 or the second trained machine learning model outlined in step 208. For the first trained machine learning model, the neural network 300 may be trained based on data collected from one or more sensors corresponding to valid and invalid user postures based on the established criteria. For the second trained machine learning model, the neural network 300 may be trained based on data collected from one or more sensors corresponding to valid and invalid user head orientation based on the established criteria.

In embodiments, a single neural network 300 is trained on user posture and head orientation. In embodiments, processor 102 includes a first dedicated neural network for the first trained machine learning model and a second dedicated neural network for the second trained machine learning model.

The training data set consists of various examples of readouts from one or more sensors corresponding to head orientations and user postures of a user captured from different angles and windows within the field of view of the sensors. These varied readouts provide a training set the neural network 300 uses to accurately discern between valid and invalid head positions and user postures relative to the device.

In embodiments, the training phase includes a labeling step where valid and invalid head positions and user postures are labeled to discern between the user's valid and invalid orientations and postures. The data used during the training phase are data collected that represent a user at different locations and different positions with respect to the time-of-flight sensor as arranged in system 100. In embodiments, the data used for the training phase correspond to data collected during the training of the neural network as would be implemented during the operating phase of the neural network, as further detailed in methods 400 and 500.

In embodiments, the training of the neural network 300 is based on a t-distributed Stochastic Neighbor Embedding (t-SNE) of training data with a binary type of classification to differentiate between valid and invalid head positions, user posture, or both.

Figure 4:
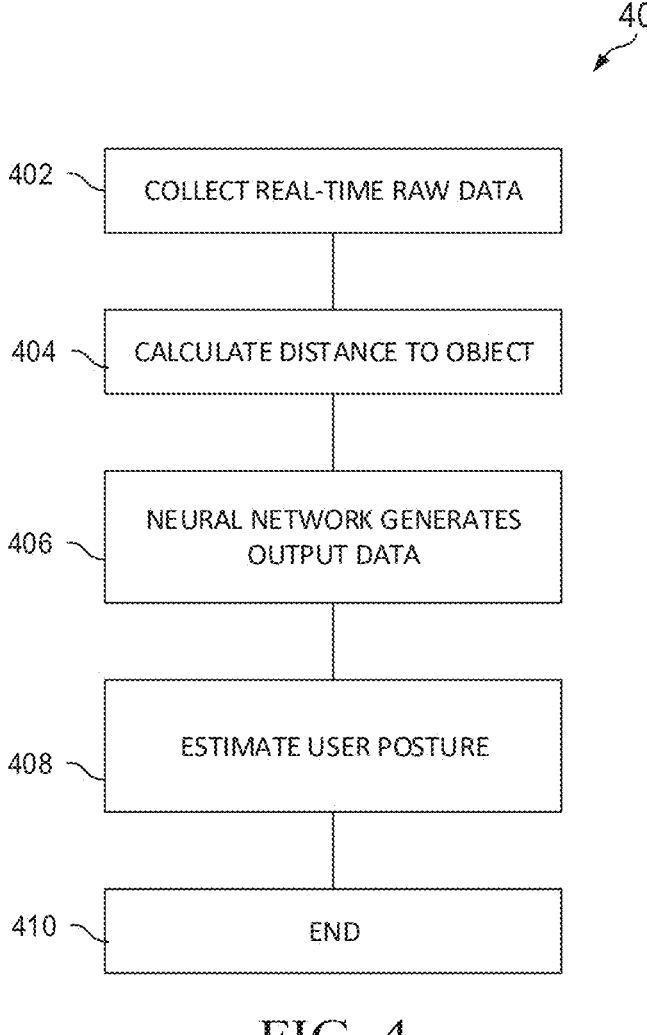
FIG. 4 is a flow chart of an embodiment method to determine a user's posture.

FIG. 4 illustrates a flow chart of an embodiment method 400, which can be implemented in system 100 to determine a user's posture. It is noted that all steps outlined in method 400 are not necessarily required and can be optional. Further, changes to the arrangement of the steps, removal of one or more steps and path connections, and addition of steps and path connections are similarly contemplated.

At step 402, one or more device sensors collect real-time raw data. The raw data can be processed to calculate the distance between the device and the object in the sensor's field of view.

In embodiments, the raw data correspond to temporal datasets collected by photodetectors of a time-of-flight sensor, such as the ToF sensor 106. The system may segment its field of view into specific, distinct areas, typically called "zones." Each zone can represent a portion of the overall 3D space monitored by the time-of-flight sensor. By dividing the field of view into zones, the time-of-flight system can provide more granular and localized depth information for different scene segments.

At step 404, processor 102 processes the real-time raw data to calculate the distance between the device and the object at a given moment for each zone. The processed data form a new set of temporal data indicating the measured distance between the device and the object at each zone.

In embodiments, step 404 further includes identifying the main user (e.g., the closest object) across the various zones of the time-of-flight sensor by assigning a valid value to a state value for that zone. Once the closest object has been identified, the state value for a zone with objects not classified as the main user is set to an invalid value (e.g., set to zero).

In embodiments, the state value for a zone is assigned an arbitrary invalid value when the object within the zone is outside a threshold range, effectively invalidating data for all non-main user objects. The remaining data corresponding to the main user are normalized by applying appropriate offset and scale adjustments.

In embodiments, the calculated value for each zone includes the distance between the device and the object in the field of view of one or more sensors. In embodiments, the distance is calculated in millimeters (mm).

In embodiments, the distance calculated for a zone is set to an arbitrary value (e.g., 4000 mm) when the object is outside a threshold distance from the device for that zone. In embodiments, the distance calculated for a zone with an invalid state value is set to the arbitrary value.

In embodiments, the number of inputs of the neural network is generally static and cannot be changed dynamically from frame to frame. For example, the neural network to determine the user's position based on method 400 can be designed with 64 inputs, each corresponding to one distance for a specific zone. If a zone does not encompass a main user, the distance value for that zone, as returned by the ToF sensor 106, can vary and represent any object behind the main user, such as the ceiling. To aid the neural network in distinguishing that a zone is irrelevant for evaluating the user's posture, the distance for that zone can be consistently set to an invalid state value, such as 4000. This fixed value is input into the neural network, enabling it to learn and recognize that an input 4000 (i.e., the invalid state value) signifies a zone not associated with the main user.

In embodiments, the state values are not directly fed into the neural network; only the distance values are utilized. The state values force certain distance values to the invalid state value when their respective zones do not cover the main user. An alternative approach could involve feeding the state and distance values into the neural network.

Using an arbitrary value allows the system to disregard zones that do not contain useful information related to the user. This enables the neural network to concentrate on relevant data, enhancing performance. By focusing solely on meaningful inputs, the neural network becomes more efficient and effective in processing the information related to the user.

In embodiments, there is a one-to-one correspondence between the number of segmented zones and nodes of the input layer. In embodiments, the input layer corresponds to the input layer 302 of neural network 300.

The neural network is previously trained on datasets collected during a training phase based on various posture positions of a user and other objects moving near the device. The training phase is used to adjust the values for the weights and biases of the trained neural network.

In embodiments, through a process involving backpropagation and an optimization algorithm, such as stochastic gradient descent, the neural network iteratively improves the values for the weights and biases to minimize the difference between the predicted output and the actual target values (the error). Non-linear activation functions can also be applied during this phase to introduce non-linearity to the model, enabling it to learn and represent more complex relationships in the data.

At step 406, the trained neural network generates output data at its output node based on the input data and the trained model of the neural network. In embodiments, the output data is a binary value that is either valid or invalid. In embodiments, the output data is a single value within a range of values. In embodiments, the trained neural network includes two output nodes—the two nodes correspond to a classification of a 'yes' or 'valid' output and a 'no' or 'invalid' output. In embodiments, the output layer of the trained neural network includes three output nodes—the three nodes correspond to a classification of a 'yes' or 'valid' output, a 'no' or an 'invalid' output, and 'nothing.' In embodiments, the output layer corresponds to the output layer 306 of neural network 300. The output of the trained neural network provides a binary value between a good and bad posture or an estimate of the user's posture that is within a range of values.

At step 408, the output data is analyzed to determine or estimate whether the real-time raw data collected by the device's one or more sensors correspond to a valid or invalid user posture condition. If the output data indicates an invalid user posture condition, the process is repeated for the next raw data set collected by one or more sensors. Otherwise, method 400 ends at step 410.

Figure 5:
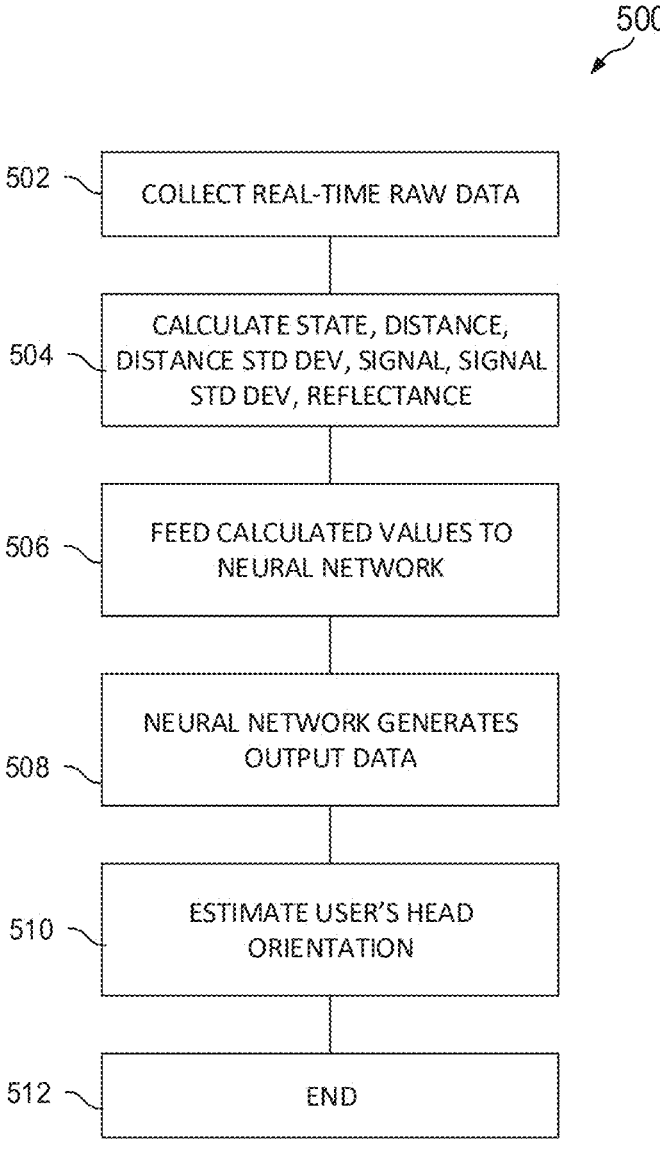
FIG. 5 is a flow chart of an embodiment method to determine a user's head orientation.

FIG. 5 illustrates a flow chart of an embodiment method 500, which can be implemented in system 100 to determine a user's head orientation. It is noted that all steps outlined in method 500 are not necessarily required and can be optional. Further, changes to the arrangement of the steps, removal of one or more steps and path connections, and addition of steps and path connections are similarly contemplated.

At step 502, one or more device sensors collect real-time raw data. The raw data can be processed to calculate one or more values associated with the object in view of the device before being fed to the trained neural network.

At step 504, processor 102 processes the real-time raw data to calculate one or more values associated with the object at a given moment for each zone. The processed data form a new temporal data set indicating one or more values at each zone.

In embodiments, step 504 further includes identifying the main user (e.g., the closest object) across the various zones of the time-of-flight sensor by assigning a valid value to a state value for that zone. Once the closest object has been identified, the state value for a zone with objects not classified as the main user is set to an invalid value (e.g., set to zero).

In embodiments, the state value for a zone is assigned an arbitrary invalid value when the object within the zone is outside a threshold range, effectively invalidating data for all non-main user objects. The remaining data corresponding to the main user are normalized by applying appropriate offset and scale adjustments.

In embodiments, the calculated value for each zone includes the distance between the device and the object in the field of view of one or more sensors. In embodiments, the distance is calculated in millimeters (mm).

In embodiments, the distance calculated for a zone is set to an arbitrary value (e.g., 4000 mm) when the object is outside a threshold distance from the device for that zone. In embodiments, the distance calculated for a zone with an invalid state value is set to the arbitrary value.

Using an arbitrary value allows the system to disregard zones that do not contain useful information related to the user. This enables the neural network to concentrate on relevant data, enhancing performance. By focusing solely on meaningful inputs, the neural network becomes more efficient and effective in processing the information related to the user.

In embodiments, the calculated value for each zone includes an estimation of the standard deviation of the distance calculations. A large standard deviation value can indicate that the calculated distance is noisy or unstable over time. In embodiments, the standard deviation value is set to an arbitrary value (e.g., 100 mm) when the object is outside a threshold value.

In embodiments, the calculated value for each zone includes a signal value corresponding to reflected photons detected by the time-of-flight sensor. The signal value can be expressed in kilo counts per second per SPAD (kcps/spad). The signal value can indicate the intensity of the return signal that the sensor receives from the object in a specific zone of its field of view.

In embodiments, the signal value is set to an arbitrary value (e.g., 0 kcps/spad) when the object is outside a threshold value for that zone.

In embodiments, for each zone, the calculated value includes an estimation of the standard deviation of the signal values. A large standard deviation value can indicate that the calculated signal is noisy or unstable over time. In embodiments, the standard deviation value is set to an arbitrary value (e.g., 50 kcps/spad) when the object is outside a threshold value.

In embodiments, the calculated value includes a reflectance value for each zone. The reflectance value can be an estimation of the percentage of photons reflected back by the object versus the total number of photons sent by the light emitter in the time-of-flight system. The reflection value corresponds to a combination of each zone's signal and distance values. The reflectance value can characterize the material associated with the object in front of the sensor. In embodiments, the reflectance value is set to an arbitrary value (e.g., 0%) when the object is outside a threshold value.

For example, the reflectance value can be a percentage calculated based on the number of photons sent back by the target and the distance from the estimated target. Regardless of tone, human skin has a typical reflectance of around 60%, and hairs reflect at least 10%, according to color.

At step 506, the calculated distance, the signal, the standard deviation of the distance, the standard deviation of the signal, the reflectance values, or a combination thereof, for any given time for each zone is provided as inputs to the input layer of a trained neural network. In embodiments, the inputs to the trained neural network are limited to zones with valid distance, signal, the standard deviation of the distance, the standard deviation of the signal, and reflectance values.

In embodiments, there is a one-to-one correspondence between the number of nodes of the input layer and a multiplier of the number of segmented zones and the number of calculated values for each zone. In embodiments, the input layer corresponds to the input layer 302 of neural network 300.

The neural network is previously trained on datasets collected during a training phase based on various head orientations of a user and other objects near the device. The training phase is used to adjust the values for the weights and biases of the trained neural network.

As previously discussed, in embodiments, through a process involving backpropagation and an optimization algorithm, such as stochastic gradient descent, the neural network iteratively improves the values for the weights and biases to minimize the difference between the predicted output and the actual target values (the error). Non-linear activation functions can also be applied during this phase to introduce non-linearity to the model, enabling it to learn and represent more complex relationships in the data.

At step 508, the trained neural network generates output data at its output node based on the input data and the trained model of the neural network. In embodiments, the output layer corresponds to the output layer 306 of neural network 300.

In embodiments, the neural network's output layer includes 6 nodes, each representing one of the North (N), North-East (NE), North-West (NW), East (E), West (W), and South(S) directions. In embodiments, the output node includes a valid or an invalid value. A valid classification at an output node represents a user's face toward the associated direction for that node. In contrast, an invalid classification at the output node represents the user's face that is not directed in the associated direction. In embodiments, the output node is a value within a range of values, such as between 0 and 100. The value at the output node represents an estimation of whether the user's face is directed toward the associated direction for that node.

In embodiments, the neural network's output layer includes a single node, representing a single value that is either valid or invalid. A valid classification at the output of the single output node represents user engagement. In contrast, the invalid classification at the output of the single output node represents the failure of user engagement. In embodiments, the output data is a single value within a range of values. The value at the output node represents an estimation of whether the user's face is directed toward the associated direction for that node.

In embodiments, the trained neural network includes two output nodes—the two nodes correspond to a classification of a 'yes' or 'valid' output and a 'no' or 'invalid' output.

In embodiments, the output layer of the trained neural network includes three output nodes—the three nodes correspond to a classification of a 'yes' or 'valid' output, a 'no' or an 'invalid' output, and 'nothing.'

At step 510, the output data is analyzed to determine whether the real-time raw data collected by the device's one or more sensors correspond to a valid or invalid head orientation. Suppose the output data is determined to indicate an invalid head orientation condition. In that case, the process is repeated for the next set of raw data collected by one or more sensors. Otherwise, method 500 ends at step 512.

Figure 6:
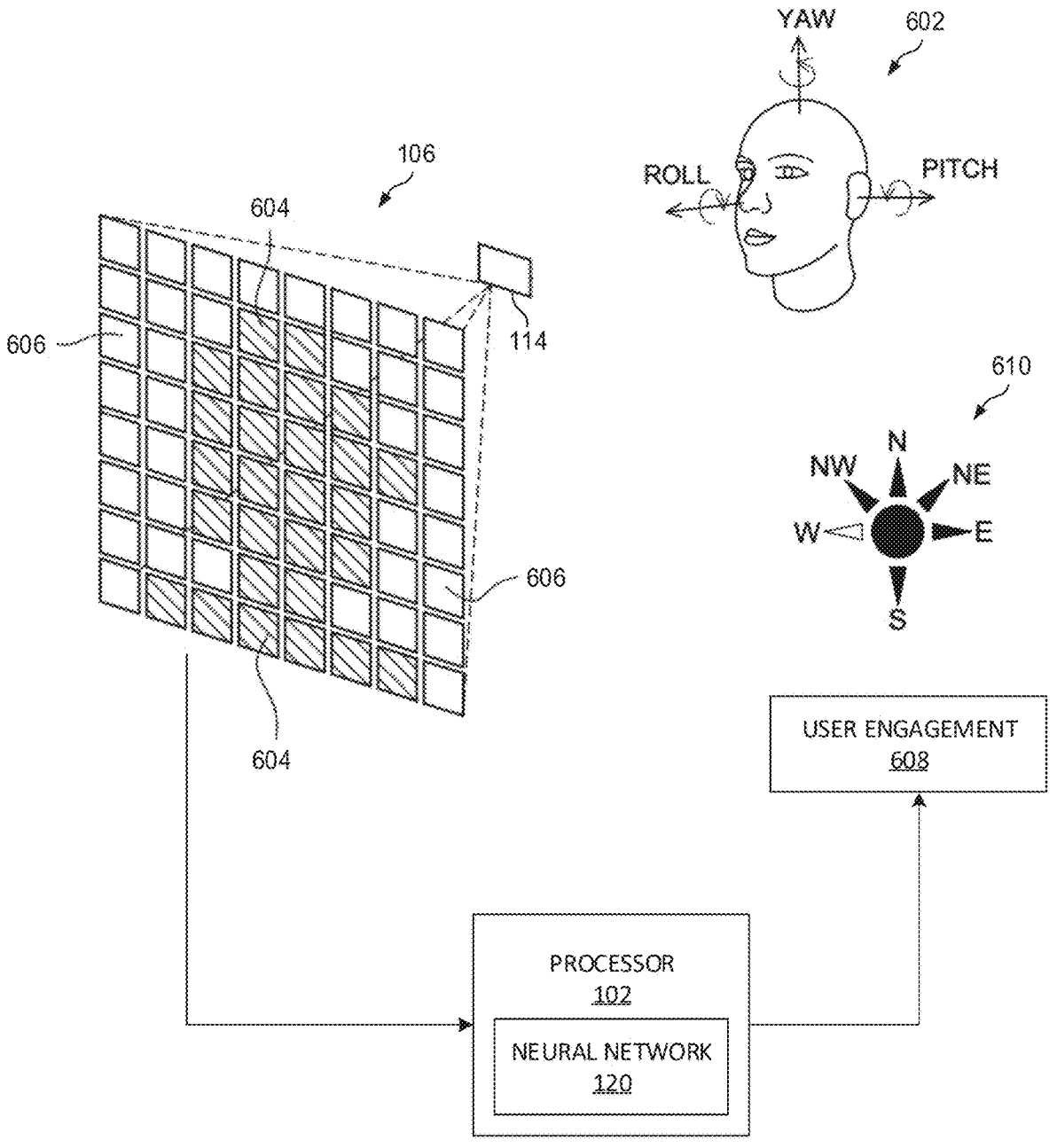
FIG. 6 illustrates the positioning of user with respect to a ToF sensor.

FIG. 6 illustrates the positioning of user 602 with respect to ToF sensor 106. Processor 102 can determine the user's posture and head orientation to estimate the user engagement 608 based on the data collected by the ToF sensor 106.

ToF sensor 106 includes an array of photodetectors 114 with multiple pixels sensitive to the emitted light's specific wavelength. In the example shown in FIG. 6, the ToF sensor 106 includes 64 pixels arranged in a square with 8 pixels per side.

In FIG. 6, the user 602 is positioned in front of the ToF sensor 106. The user 602 can rotate his head according to rotational movements around three axes. A rotation around the z-axis (YAM) corresponds to the head-turning (or rotating) to the right or left. A rotation around the y-axis (ROLL) corresponds to the head-turning in a plane parallel to user 602 (i.e., causing the head to rotate towards the shoulder without rotating the same to the left or right). A rotation around the x-axis (PITCH) corresponds to the head being lowered towards the ground or rising toward the sky.

During a capture performed by the ToF sensor 106, each pixel measures different information. For example, the pixels can measure the distance between ToF sensor 106 and a target facing the ToF sensor 106. The target, such as user 602, does not necessarily occupy the field of view measured by the ToF sensor 106. Thus, pixel 604 can detect user 602 when the measured distance is a finite value or a value less than a threshold value. Other pixels 606 do not detect user 602 and can be associated with the background of the captured scene.

In embodiments, a state value is further generated for each pixel after the measurements are performed for each pixel. As an example, the state value is a Boolean value, having, for example, the true value (TRUE) when the measured distance indicates that the user 602 was detected by the pixel. The state value has, for example, the false value (FALSE) when the measured values by the pixel are abnormal. As an example, when user 602 is not detected, the value FALSE is allocated to the pixel.

In FIG. 6, the state values of pixel 604 are allocated to the value TRUE, and the state values of pixel 606 are allocated to the value FALSE. The state values can be within a range of values (e.g., between 0 and 100), representing a confidence index of the pixel.

In embodiments, the measurements are forwarded to processor 102 and processed by the neural network 120. Based on the received measurements, processor 102 is configured to generate estimates of the user engagement 608 based on the output of the second trained machine learning model as determined in step 208. The user engagement 608 provides an estimate or a determination, by the neural network 120, of the user's engagement with the device housing the ToF sensor 106.

In embodiments, the estimate of the user engagement 608 can be a Boolean value taking the value FALSE when the user is determined, at step 208, not to be engaged with the device. The estimate of the user engagement 608 can be the value TRUE when the user is determined, at step 208, to be engaged with the device.

In embodiments, the estimate of the user engagement 608 can be within a range of values between, for example, 0 and 100. In this embodiment, the value 0 can indicate, for example, that the head of user 602 is fully rotated away from the device, and the value 100 can indicate, for example, that the face of user 602 is positioned fully centered and facing directly toward the device.

For example, the estimate of the user engagement 608 takes the form of a direction 610 among the North (N), North-East (NE), North-West (NW), East (E), West (W), and South(S) directions. The North direction, for example, indicates that user 602 is facing the display of the device hosting the ToF sensor 106. The East and West directions, for example, respectively, indicate that the face of the user 602 is rotated 90° to the right and at left of the display. The South direction, for example, indicates that user 602 has its back facing the display.

The embodiments disclosed herein represent a significant advancement in the classification of detecting user engagement relative to the device, leveraging a smaller neural network 300 to perform tasks previously dependent on much larger networks. Conventional solutions necessitated expansive neural networks, which demanded substantial memory allocation for the storage of parameters, resulting in large model sizes and increased memory requirements for the memory 104. These requirements can be cost-prohibitive and impractical for deployment in devices with limited computational resources.

In contrast, the disclosed embodiments mitigate these challenges by introducing an optimized neural network architecture that significantly reduces the model's complexity without compromising accuracy or performance. By using a more compact neural network, the system's efficiency is markedly improved-requiring less memory and lowering both the power consumption and the cost associated with implementing such orientation classification systems. Consequently, this approach paves the way for broader applicability of intelligent user posture and head orientation detection across various devices, including those with stringent resource constraints.

A first aspect relates to a device. The device includes a time-of-flight (ToF) sensor and a processor. The Tof Sensor is configured to collect real time raw data of a scene comprising a user in a field of view of the ToF sensor. The processor comprising a first neural network and a second neural network, wherein the first neural network is configured to generate an estimate of a posture of the user based on a distance calculated for each zone of the ToF sensor to the user, wherein the second neural network is configured to, in response to determining by the processor that the estimate of the posture of the user meets a first criterion, generate an estimate of a head orientation of the user based on the distance, a standard deviation of the distance, a signal value corresponding to a number of photons returning towards the ToF sensor per unit of time, the a standard deviation of the signal value, and a reflection value calculated for each zone of the ToF sensor, and wherein the processor is configured to transition the device from a low-power operating mode to a normal operating mode in response to determining that the user is actively engaged with the device based on the estimate of the head orientation of the user.

In a first implementation form of the device according to the first aspect as such, the processor is further configured to determine a duration that the user is actively engaged with the device. The processor is configured to transition the device from a low-power operating mode to a normal operating mode in response to determining that the duration the user is actively engaged with the device based on the estimate of the head orientation of the user exceeds a threshold.

In a second implementation form of the device according to the first aspect as such or any preceding implementation form of the first aspect, the estimate of the head orientation of the user is a direction describing an orientation of a face of the user, among the North, North-East, North-West, East, West, and South directions. The North direction indicates that the user is facing the ToF sensor, and the South direction indicates that the user has its back facing the ToF sensor.

In a third implementation form of the device according to the first aspect as such or any preceding implementation form of the first aspect, an output layer of the second neural network includes six nodes, each node corresponding to one of the North, North-East, North-West, East, West, and South directions. The node corresponding to the North direction equals "1" when the user is facing the ToF sensor and the other nodes are equal to "0."

In a fourth implementation form of the device according to the first aspect as such or any preceding implementation form of the first aspect, the first criterion comprises the user sitting within a threshold distance from the device and the head of the user is within the field of view of the ToF sensor.

In a fifth implementation form of the device according to the first aspect as such or any preceding implementation form of the first aspect, the estimate of the head orientation of the user is a Boolean value having a value of "0," indicating the user is not actively engaged with the device or a value of "1," indicating that the user is actively engaged with the device.

In a sixth implementation form of the device according to the first aspect as such or any preceding implementation form of the first aspect, the estimate of the head orientation of the user is a value within a range of values. The value at the first extreme of the range of values indicates the user's head is fully rotated away from the device, and a value at the other extreme of the range of values indicates that the face of the user is directly positioned in front of the device and centered within the field of view of the ToF sensor.

A second aspect relates to a method. The method includes collecting, by a time-of-flight (ToF) sensor of a device, real time raw data of a scene comprising a user in a field of view of the ToF sensor; generating, by a first neural network, an estimate of a posture of the user based on a distance calculated for each zone of the ToF sensor to the user; generating, by a second neural network and in response to determining by a processor that the estimate of the posture of the user meets a first criterion, an estimate of a head orientation of the user based on the distance, a standard deviation of the distance, a signal value corresponding to a number of photons returning towards the ToF sensor per unit of time, a standard deviation of the signal value, and a reflection value calculated for each zone of the ToF sensor to the user; and transitioning, by the processor, the device from a low-power operating mode to a normal operating mode in response to determining that the user is actively engaged with the device based on the estimate of the head orientation of the user.

In a first implementation form of the method according to the second aspect as such, the method further comprises determining, by the processor, a duration that the user is actively engaged with the device, wherein the determining that the user is actively engaged with the device comprises determining that the duration the user is actively engaged with the device based on the estimate of the head orientation of the user exceeds a threshold.

In a second implementation form of the method according to the second aspect as such or any preceding implementation form of the second aspect, the estimate of the head orientation of the user is a direction describing an orientation of a face of the user, among the North, North-East, North-West, East, West, and South directions. The North direction indicates that the user is facing the ToF sensor, and the South direction indicates that the user has its back facing the ToF sensor.

In a third implementation form of the method according to the second aspect as such or any preceding implementation form of the second aspect, an output layer of the second neural network includes six nodes, each node corresponding to one of the North, North-East, North-West, East, West, and South directions. The node corresponding to the North direction equals "1" when the user is facing the ToF sensor and the other nodes are equal to "0."

In a fourth implementation form of the method according to the second aspect as such or any preceding implementation form of the second aspect, the first criterion comprises the user sitting within a threshold distance from the device and the head of the user is within the field of view of the ToF sensor.

In a fifth implementation form of the method according to the second aspect as such or any preceding implementation form of the second aspect, the estimate of the head orientation of the user is a Boolean value having a value of "0," indicating the user is not actively engaged with the device or a value of "1," indicating that the user is actively engaged with the device.

In a sixth implementation form of the method according to the second aspect as such or any preceding implementation form of the second aspect, the estimate of the head orientation of the user is a value within a range of values. The value at the first extreme of the range of values indicates the user's head is fully rotated away from the device, and a value at the other extreme of the range of values indicates that a face of the user is directly positioned in front of the device and centered within the field of view of the ToF sensor.

A third aspect relates to a method. The method includes collecting, by a time-of-flight (ToF) sensor of a device, raw data of scenes in a field of view of the ToF sensor, wherein the scenes correspond to different rotations, orientations, positionings of a user in the field of view of the ToF sensor; training a neural network using the collected raw data; collecting, by the ToF, real time raw data of a scene comprising a user in the field of view of the ToF sensor; generating, by the neural network, an estimate of a posture of the user based on a distance calculated for each zone of the ToF sensor; generating, by the neural network and in response to determining by a processor that the estimate of the posture of the user meets a first criterion, an estimate of a head orientation of the user based on the distance, a standard deviation of the distance, a signal value corresponding to a number of photons returning towards the ToF sensor per unit of time, and a standard deviation of the signal value for each zone of the ToF sensor to the user; and activating, by the processor, an authentication procedure in response to determining that the user is actively engaged with the device based on the estimate of the head orientation of the user.

In a first implementation form of the method according to the third aspect as such, the generating the estimate of the head orientation further comprises generating the estimate of the head orientation based on a reflection value calculated for each zone of the ToF sensor.

In a second implementation form of the method according to the third aspect as such or any preceding implementation form of the third aspect, the estimate of the head orientation of the user is a direction describing an orientation of a face of the user, among the North, North-East, North-West, East, West, and South directions. The North direction indicates that the user is facing the ToF sensor, and the South direction indicates that the user has its back facing the ToF sensor.

In a third implementation form of the method according to the third aspect as such or any preceding implementation form of the third aspect, an output layer of the neural network includes six nodes, each node corresponding to one of the North, North-East, North-West, East, West, and South directions, wherein the node corresponding to the North direction equals "1" when the user is facing the ToF sensor and the other nodes are equal to "0."

In a fourth implementation form of the method according to the third aspect as such or any preceding implementation form of the third aspect, the estimate of the head orientation of the user is a Boolean value having a value of "0," indicating the user is not actively engaged with the device or a value of "1," indicating that the user is actively engaged with the device, or the estimate of the head orientation of the user is a value within a range of values, wherein the value at a first extreme of the range of values indicates the users head is fully rotated away from the device and a value at the other extreme of the range of values indicates that a face of the user is directly positioned in front of the device and centered within the field of view of the ToF sensor.

In a fifth implementation form of the method according to the third aspect as such or any preceding implementation form of the third aspect, the first criterion comprises the user sitting within a threshold distance from the device and the head of the user is within the field of view of the ToF sensor.

Although the description has been described in detail, it should be understood that various changes, substitutions, and alterations may be made without departing from the spirit and scope of this disclosure as defined by the appended claims. The same elements are designated with the same reference numbers in the various figures. Moreover, the scope of the disclosure is not intended to be limited to the particular embodiments described herein, as one of ordinary skill in the art will readily appreciate from this disclosure that processes, machines, manufacture, compositions of matter, means, methods, or steps, presently existing or later to be developed, may perform substantially the same function or achieve substantially the same result as the corresponding embodiments described herein. Accordingly, the appended claims are intended to include within their scope such processes, machines, manufacture, compositions of matter, means, methods, or steps.

The specification and drawings are, accordingly, to be regarded simply as an illustration of the disclosure as defined by the appended claims, and are contemplated to cover any and all modifications, variations, combinations, or equivalents that fall within the scope of the present disclosure.

What is claimed is:

1. A device, comprising:
a time-of-flight (ToF) sensor configured to collect real time raw data of a scene comprising a user in a field of view of the ToF sensor; and
a processor comprising a first neural network and a second neural network,
wherein the first neural network is configured to generate an estimate of a posture of the user based on a distance calculated for each zone of the ToF sensor to the user,
wherein the second neural network is configured to, in response to determining by the processor that the estimate of the posture of the user meets a first criterion, generate an estimate of a head orientation of the user based on the distance, a standard deviation of the distance, a signal value corresponding to a number of photons returning towards the ToF sensor per unit of time, the a standard deviation of the signal value, and a reflection value calculated for each zone of the ToF sensor, and
wherein the processor is configured to transition the device from a low-power operating mode to a normal operating mode in response to determining that the user is actively engaged with the device based on the estimate of the head orientation of the user.

2. The device of claim 1, wherein the processor is further configured to determine a duration that the user is actively engaged with the device, wherein the processor is configured to transition the device from a low-power operating mode to a normal operating mode in response to determining that the duration the user is actively engaged with the device based on the estimate of the head orientation of the user exceeds a threshold.

3. The device of claim 1, wherein the estimate of the head orientation of the user is a direction describing an orientation of a face of the user, among the North, North-East, North-West, East, West, and South directions, the North direction indicating that the user is facing the ToF sensor, and the South direction indicating that the user has its back facing the ToF sensor.

4. The device of claim 3, wherein an output layer of the second neural network includes six nodes, each node corresponding to one of the North, North-East, North-West, East, West, and South directions, wherein the node corresponding to the North direction equals "1" when the user is facing the ToF sensor and the other nodes are equal to "0".

5. The device of claim 1, wherein the first criterion comprises the user sitting within a threshold distance from the device and the head of the user is within the field of view of the ToF sensor.

6. The device of claim 1, wherein the estimate of the head orientation of the user is a Boolean value having a value of "0," indicating the user is not actively engaged with the device or a value of "1," indicating that the user is actively engaged with the device.

7. The device of claim 1, wherein the estimate of the head orientation of the user is a value within a range of values, wherein the value at a first extreme of the range of values indicates the user's head is fully rotated away from the device and a value at the other extreme of the range of values indicates that a face of the user is directly positioned in front of the device and centered within the field of view of the ToF sensor.

8. A method, comprising:
collecting, by a time-of-flight (ToF) sensor of a device, real time raw data of a scene comprising a user in a field of view of the ToF sensor;
generating, by a first neural network, an estimate of a posture of the user based on a distance calculated for each zone of the ToF sensor to the user;
generating, by a second neural network and in response to determining by a processor that the estimate of the posture of the user meets a first criterion, an estimate of a head orientation of the user based on the distance, a standard deviation of the distance, a signal value corresponding to a number of photons returning towards the ToF sensor per unit of time, a standard deviation of the signal value, and a reflection value calculated for each zone of the ToF sensor to the user; and
transitioning, by the processor, the device from a low-power operating mode to a normal operating mode in response to determining that the user is actively engaged with the device based on the estimate of the head orientation of the user.

9. The method of claim 8, further comprising determining, by the processor, a duration that the user is actively engaged with the device, wherein the determining that the user is actively engaged with the device comprises determining that the duration the user is actively engaged with the device based on the estimate of the head orientation of the user exceeds a threshold.

10. The method of claim 8, wherein the estimate of the head orientation of the user is a direction describing an orientation of a face of the user, among the North, North-East, North-West, East, West, and South directions, the North direction indicating that the user is facing the ToF sensor, and the South direction indicating that the user has its back facing the ToF sensor.

11. The method of claim 10, wherein an output layer of the second neural network includes six nodes, each node corresponding to one of the North, North-East, North-West, East, West, and South directions, wherein the node corresponding to the North direction equals "1" when the user is facing the ToF sensor and the other nodes are equal to "0".

12. The method of claim 8, wherein the first criterion comprises the user sitting within a threshold distance from the device and the head of the user is within the field of view of the ToF sensor.

13. The method of claim 8, wherein the estimate of the head orientation of the user is a Boolean value having a value of "0," indicating the user is not actively engaged with the device or a value of "1," indicating that the user is actively engaged with the device.

14. The method of claim 8, wherein the estimate of the head orientation of the user is a value within a range of values, wherein the value at a first extreme of the range of values indicates the users head is fully rotated away from the device and a value at the other extreme of the range of values indicates that a face of the user is directly positioned in front of the device and centered within the field of view of the ToF sensor.

15. A method, comprising:
collecting, by a time-of-flight (ToF) sensor of a device, raw data of scenes in a field of view of the ToF sensor, wherein the scenes correspond to different rotations, orientations, positionings of a user in the field of view of the ToF sensor;

training a neural network using the collected raw data;

collecting, by the ToF, real time raw data of a scene comprising a user in the field of view of the ToF sensor;

generating, by the neural network, an estimate of a posture of the user based on a distance calculated for each zone of the ToF sensor;

generating, by the neural network and in response to determining by a processor that the estimate of the posture of the user meets a first criterion, an estimate of a head orientation of the user based on the distance, a standard deviation of the distance, a signal value corresponding to a number of photons returning towards the ToF sensor per unit of time, and a standard deviation of the signal value for each zone of the ToF sensor to the user; and activating, by the processor, an authentication procedure in response to determining that the user is actively engaged with the device based on the estimate of the head orientation of the user.

16. The method of claim 15, wherein the generating the estimate of the head orientation further comprises generating the estimate of the head orientation based on a reflection value calculated for each zone of the ToF sensor.

17. The method of claim 15, wherein the estimate of the head orientation of the user is a direction describing an orientation of a face of the user, among the North, North-East, North-West, East, West, and South directions, the North direction indicating that the user is facing the ToF sensor, and the South direction indicating that the user has its back facing the ToF sensor.

18. The method of claim 15, wherein an output layer of the neural network includes six nodes, each node corresponding to one of the North, North-East, North-West, East, West, and South directions, wherein the node corresponding to the North direction equals "1" when the user is facing the ToF sensor and the other nodes are equal to "0".

19. The method of claim 15, wherein the estimate of the head orientation of the user is a Boolean value having a value of "0," indicating the user is not actively engaged with the device or a value of "1," indicating that the user is actively engaged with the device, or wherein the estimate of the head orientation of the user is a value within a range of values, wherein the value at a first extreme of the range of values indicates the users head is fully rotated away from the device and a value at the other extreme of the range of values indicates that a face of the user is directly positioned in front of the device and centered within the field of view of the ToF sensor.

20. The method of claim 15, wherein the first criterion comprises the user sitting within a threshold distance from the device and the head of the user is within the field of view of the ToF sensor.

*    *    *    *    *